United States Patent
Lim

(10) Patent No.: US 10,014,496 B2
(45) Date of Patent: Jul. 3, 2018

(54) RECHARGEABLE BATTERY

(71) Applicant: SAMSUNG SDI CO., LTD., Yongin-si, Gyeonggi-do (KR)

(72) Inventor: Byung-Ho Lim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 210 days.

(21) Appl. No.: 14/861,842

(22) Filed: Sep. 22, 2015

(65) Prior Publication Data

US 2016/0141560 A1 May 19, 2016

(30) Foreign Application Priority Data

Nov. 19, 2014 (KR) ........................ 10-2014-0161733

(51) Int. Cl.
*H01M 2/02* (2006.01)
*H01M 2/26* (2006.01)
(Continued)

(52) U.S. Cl.
CPC ........... *H01M 2/02* (2013.01); *H01M 2/0202* (2013.01); *H01M 2/0237* (2013.01); *H01M 2/105* (2013.01); *H01M 2/1061* (2013.01); *H01M 2/263* (2013.01); *H01M 2/30* (2013.01); *H01M 2/34* (2013.01); *H01M 10/0431* (2013.01); *H01M 10/0481* (2013.01);
(Continued)

(58) Field of Classification Search
None
See application file for complete search history.

(56) References Cited

U.S. PATENT DOCUMENTS

2006/0154138 A1* 7/2006 Miyamoto .......... H01M 2/0257
429/130
2008/0102354 A1 5/2008 Lee
(Continued)

FOREIGN PATENT DOCUMENTS

| JP | 2013-098102 A | 5/2013 |
| KR | 10-2008-0085316 A | 9/2008 |
| KR | 10-2014-0064168 A | 5/2014 |

OTHER PUBLICATIONS

European search report and search opinion for EP 15194931.0 dated May 10, 2016 (6 pages).

(Continued)

*Primary Examiner* — Jonathan Crepeau
(74) *Attorney, Agent, or Firm* — Lewis Roca Rothgerber Christie LLP

(57) ABSTRACT

A rechargeable battery includes: an electrode assembly having first and second electrodes of different polarities; a finishing tape that covers a side and a lower end of the electrode assembly with respect to a virtual longitudinal center line perpendicular to a bottom face of the electrode assembly; a case that holds the electrode assembly and has an opening; a cap assembly coupled to the opening and sealing the case; a first current collecting member and a second current collecting member located within the case and connected to the first electrode and the second electrode, respectively; and a first terminal and a second terminal located on top of the cap assembly and connected to the first current collecting member and the second current collecting member, respectively.

11 Claims, 6 Drawing Sheets

(51) Int. Cl.
  *H01M 2/34* (2006.01)
  *H01M 10/04* (2006.01)
  *H01M 2/30* (2006.01)
  *H01M 10/0525* (2010.01)
  *H01M 2/10* (2006.01)

(52) U.S. Cl.
  CPC .... *H01M 10/0525* (2013.01); *H01M 2220/20* (2013.01); *H01M 2220/30* (2013.01)

(56) References Cited

U.S. PATENT DOCUMENTS

| | | | | |
|---|---|---|---|---|
| 2010/0310912 | A1* | 12/2010 | Kim | H01M 10/0431 429/94 |
| 2011/0300419 | A1* | 12/2011 | Byun | H01M 2/22 429/61 |
| 2012/0308855 | A1* | 12/2012 | Shimizu | H01M 2/0426 429/53 |
| 2014/0141338 | A1 | 5/2014 | Kim | |
| 2016/0043381 | A1* | 2/2016 | Byun | H01M 2/348 429/61 |
| 2016/0049635 | A1* | 2/2016 | Park | H01M 2/263 429/161 |
| 2016/0141564 | A1* | 5/2016 | Han | H01M 2/024 429/94 |
| 2016/0351940 | A1* | 12/2016 | Guen | H01M 10/0525 |

OTHER PUBLICATIONS

EPO Office Action dated May 26, 2017, for corresponding European Patent Application No. 15194931.0 (4 pages).

* cited by examiner

RECHARGEABLE BATTERY

CROSS-REFERENCE TO RELATED APPLICATION

This application claims priority to and the benefit of Korean Patent Application No. 10-2014-0161733 filed in the Korean Intellectual Property Office on Nov. 19, 2014, the entire contents of which are incorporated herein by reference.

BACKGROUND

1. Field

The present invention relates to a rechargeable battery.

2. Description of the Related Art

Rechargeable batteries are batteries which can be charged and discharged, unlike primary batteries which are not rechargeable. Low-capacity rechargeable batteries are used for small, portable electronics such as mobile phones, laptop computers, or camcorders, and large-capacity rechargeable batteries are widely used as power sources for driving motors of hybrid vehicles.

In recent years, high-output rechargeable batteries using a non-aqueous electrolyte solution with a high energy density have been developed. The high-output rechargeable batteries are configured as large-capacity rechargeable batteries, each of which is made of a plurality of rechargeable cells connected in series to drive motors of equipment, such as electric vehicles, that require high electric power.

Such a rechargeable battery is made by embedding an electrode assembly and an electrolyte solution in a case and sealing the case with a cap assembly. The electrode assembly includes positive and negative plates and a separator (i.e., an insulator) interposed between the positive and negative plates.

The above information disclosed in this Background section is only for enhancement of understanding of the background of the invention and therefore it may contain information that does not form the prior art that is already known in this country to a person of ordinary skill in the art.

SUMMARY

Often, an electrolyte solution is injected into an electrode assembly after the electrode assembly has been inserted into a case and secured with tape or the like. As such, the electrolyte solution may not be easily inserted into the electrode assembly due to the tape.

The present invention has been made in an effort to provide a rechargeable battery which makes it easy for an electrolyte solution to be inserted into an electrode assembly.

One or more embodiments of the present invention are directed to a rechargeable battery including: an electrode assembly having first and second electrodes of different polarities; finishing tape that covers the side and a lower end of the electrode assembly according to a virtual longitudinal center line perpendicular to a bottom face of the electrode assembly; a case that accommodates the electrode assembly and has an opening; a cap assembly that is coupled to the opening and seals the case; a first current collecting member and a second current collecting member that are located within the case and connected to the first electrode and the second electrode, respectively; and a first terminal and a second terminal that are located on top of the cap assembly and connected to the first current collecting member and the second current collecting member, respectively.

The finishing tape may be bent toward the bottom face of the electrode assembly from the lower end of the electrode assembly and overlap with a portion of the bottom face.

A first region corresponding to a region wherein the finishing tape overlaps with a portion of the bottom face of the electrode assembly may enclose a second region corresponding to a region of the bottom face that does not overlap with the finishing tape.

A width of the first region may be 1 mm or greater, and the finishing tape may be made of PET.

The electrode assembly may be wound around a winding axis and oriented in the case in a direction parallel to the winding axis.

The first electrode and the second electrode each may include an electrode plate and an electrode uncoated region that protrudes from the electrode plate.

The electrode uncoated region may protrude toward the cap assembly.

The rechargeable battery may include a plate-like current collector located between the cap assembly and the electrode assembly, and a current collecting member having a current collecting bridge that is bent from the current collector and comes into contact with the electrode uncoated region.

The virtual longitudinal center line may be in the same direction as the winding axis.

According to embodiments of the present invention, the finishing tape is attached in a way that makes it easy for the electrolyte solution to be inserted into the electrode assembly.

According to embodiments of the present invention, the finishing tape covers the side of the electrode assembly, thus minimizing damage to the electrode assembly following external impact.

DETAILED DESCRIPTION

Figure 1:
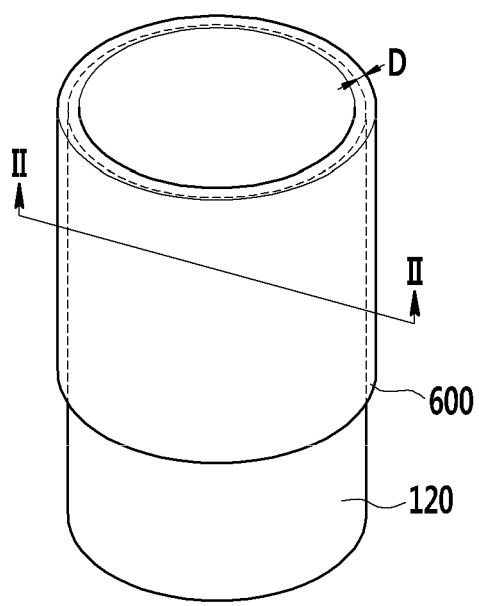
FIG. 1 is a schematic perspective view of an electrode assembly according to one or more embodiments of the present invention.

Hereinafter, embodiments of the present invention are described with reference to the accompanying drawings so that one of ordinary skill in the art may easily realize the present invention. However, the present invention may be embodied in many different forms and should not be construed as being limited to the embodiments set forth herein. Like reference numerals denote like elements throughout the specification and the drawings.

Parts not related to the description are omitted for clarity, and the same or similar constituent elements are indicated by the same reference numeral throughout the specification.

In addition, the size and thickness of each component shown in the drawings are arbitrarily shown for better understanding and ease of description, but the present embodiments are not limited thereto.

In the drawings, the thicknesses of layers and regions are magnified for clarity. In addition, in the drawings, the thicknesses of some layers and regions are exaggerated for understanding and ease of description. It will be understood that when an element such as a layer, film, region, or plate is referred to as being "on" another element, it can be directly on the other element or intervening elements may also be present.

In addition, unless explicitly described to the contrary, the word "comprise" and variations such as "comprises" or "comprising" will be understood to imply the inclusion of stated elements but not the exclusion of any other elements. Further, throughout the specification, "on" implies being positioned above or below a target element and does not imply being necessarily positioned on the top on the basis of a gravity direction.

Spatially relative terms, such as "lower", "bottom", "top" and the like, may be used herein for ease of description to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

Hereinafter, a rechargeable battery according to one or more embodiments of the present invention is described with reference to the drawings.

Figure 2:
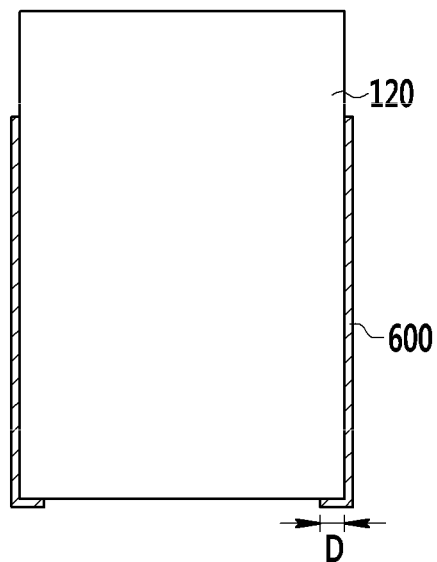
FIG. 2 is a cross-sectional view taken along the line II-II of FIG. 1.

FIG. 1 is a schematic perspective view of an electrode assembly according to one or more embodiments of the present invention, and FIG. 2 is a cross-sectional view taken along the line II-II of FIG. 1.

FIG. 1 and FIG. 2 illustrate an electrode assembly 120 of a rechargeable battery according to one or more embodiments of the present invention. The rechargeable battery including the electrode assembly 120 may be a lithium-ion rechargeable battery or a lithium-polymer battery, for example.

The electrode assembly 120 may include a first electrode and a second electrode with a separator interposed therebetween. The electrode assembly 120 is pressed flat after being wound around a winding axis. The first electrode and the second electrode may include a thin plate made of metal foil. The first and second electrodes each include regions coated with an active material and regions not coated with an active material.

Once the electrode assembly 120 is pressed, the electrode assembly 120 can be fixed with a finishing tape 600 so that the electrode assembly 120 remains pressurized.

The finishing tape 600 may be made of an insulating material such as PET (polyethylene terephthalate).

The finishing tape 600 covers the side and lower end of the electrode assembly 120 according to a virtual longitudinal center line perpendicular to a bottom face of the electrode assembly 120. The edge of the finishing tape 600 is bent from a lower end of the electrode assembly 120 (i.e., where the side and bottom face of the electrode assembly 120 meet) and toward (or along) the bottom face of the electrode assembly, and overlaps with at least a portion of the bottom face. As such, a first region of the bottom face of the electrode assembly 120 that overlaps with the finishing tape 600 encloses (or encircles) a second region on the bottom face of the electrode assembly 120 that does not overlap with (or is not covered by) the finishing tape 600. Thus, the second region of the electrode assembly 120 is not protected with the finishing tape 600 but rather is exposed.

Figure 3:
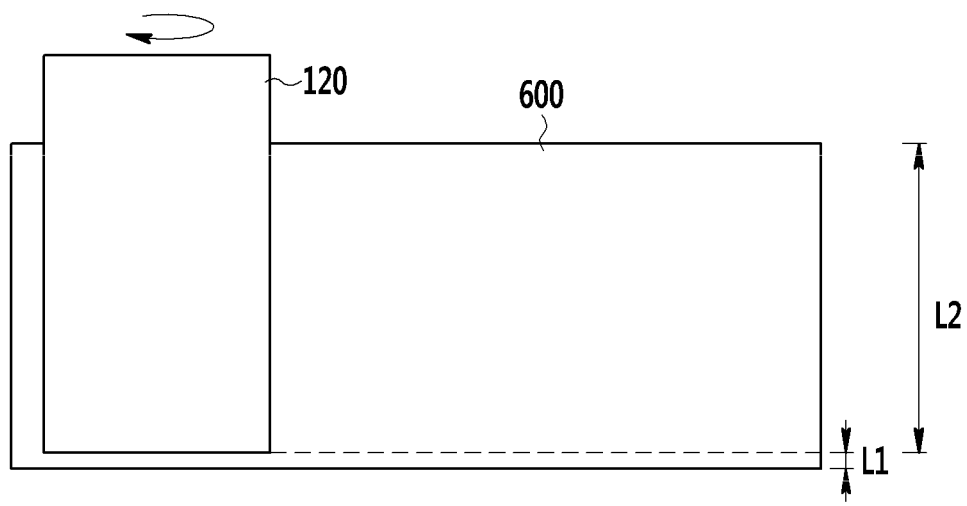
FIG. 3 is a schematic view illustrating a method of attaching finishing tape according to one or more embodiments of the present invention.

FIG. 3 is a schematic view illustrating a method of attaching finishing tape according to one or more embodiments of the present invention.

Referring to FIG. 3, the finishing tape 600 is positioned to fully cover an end (i.e., the bottom face) of the electrode assembly 120 and to extend past the end of the electrode assembly 120, leaving a margin. The finishing tape 600 is then fixed by being wound around the electrode assembly 120 in the arrow direction.

A width L1 of the margin corresponds to a region D (see FIG. 2) that overlaps with the bottom face of the electrode assembly 120. In one or more embodiments, the width L1 has a suitable length such that it overlaps with at least a portion of the bottom face of the electrode assembly 120. For example, the width L1 of the margin may be 1 mm or greater.

A width L2 of the finishing tape 600 enclosing the electrode assembly 120 may correspond to the length of the side of the electrode assembly 120 such that the side of the electrode assembly 120 is fully enclosed by the finishing tape 600. For example, the side length of the electrode assembly 120 and the width L2 of the finishing tape 600 may be equivalent.

In one or more embodiments, both ends of the finishing tape 600 may coincide with each other after being wound around the electrode assembly 120. However, in some embodiments, the ends of the finishing tape 600 may overlap after being wound around the electrode assembly 120. When the ends of the finishing tape 600 overlap, there may be a margin of 3 mm extending beyond the side of the electrode assembly 120, accounting for potential error during winding.

According to one or more embodiments of the present invention, the side of the electrode assembly 120 is enclosed and protected by the finishing tape 600, which reduces exposure to external impact on the electrode assembly 120, thereby preventing damage to the electrode assembly 120 covered by the finishing tape 600.

In addition, the finishing tape 600 according to one or more embodiments of the present invention overlaps with only a portion of the bottom face of the electrode assembly 120 (i.e., the portion corresponding to the width L1), thus leaving most of the bottom face of the electrode assembly 120 exposed.

Because a portion of the bottom face of the electrode assembly 120 is exposed, an electrolyte can be easily injected through the exposed portion of the bottom face after the electrode assembly has been inserted into the case.

A rechargeable battery including an electrode assembly fixed with finishing tape according to one or more embodiments of the present invention is described below with reference to FIGS. 4 to 6.

Figure 4:
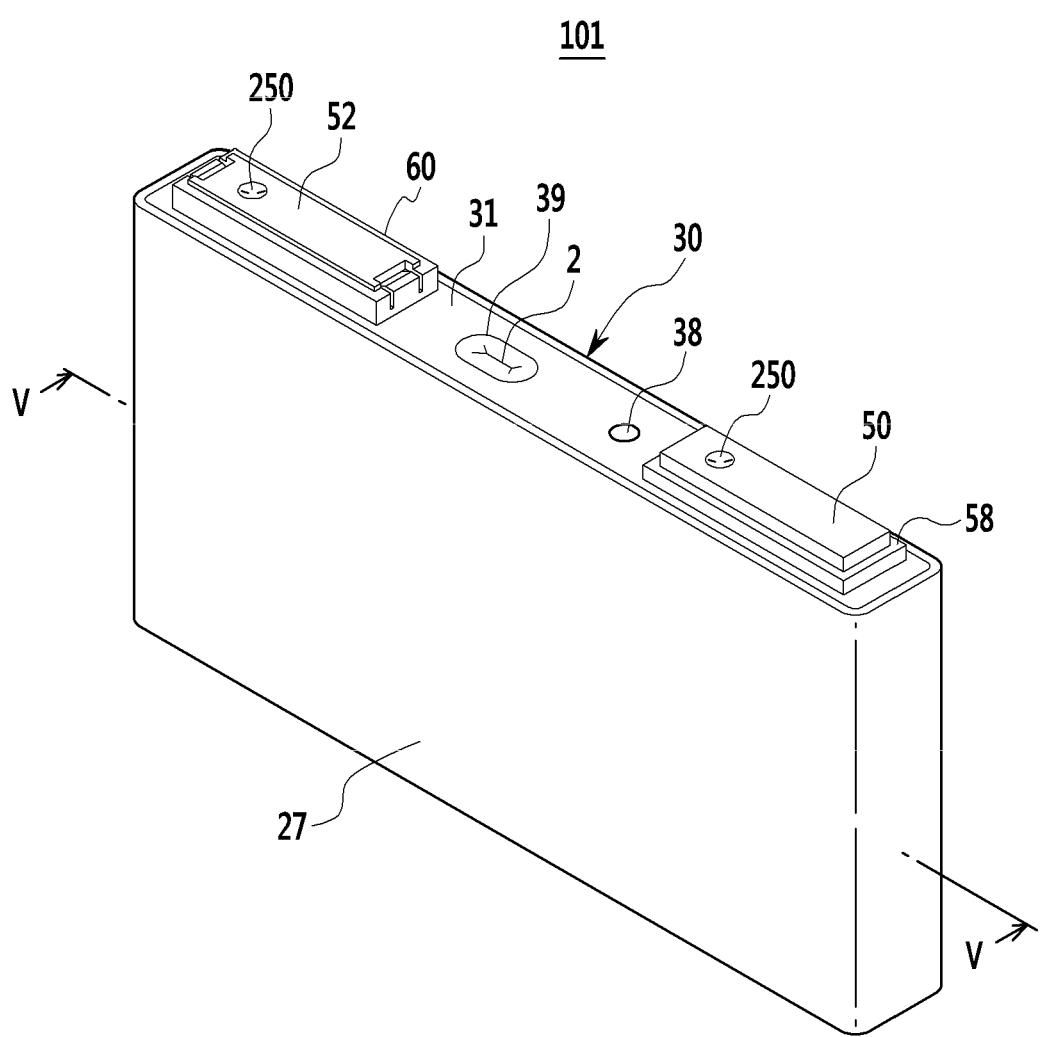
FIG. 4 is a perspective elevation view of a rechargeable battery according to one or more embodiments of the present invention.
Figure 5:
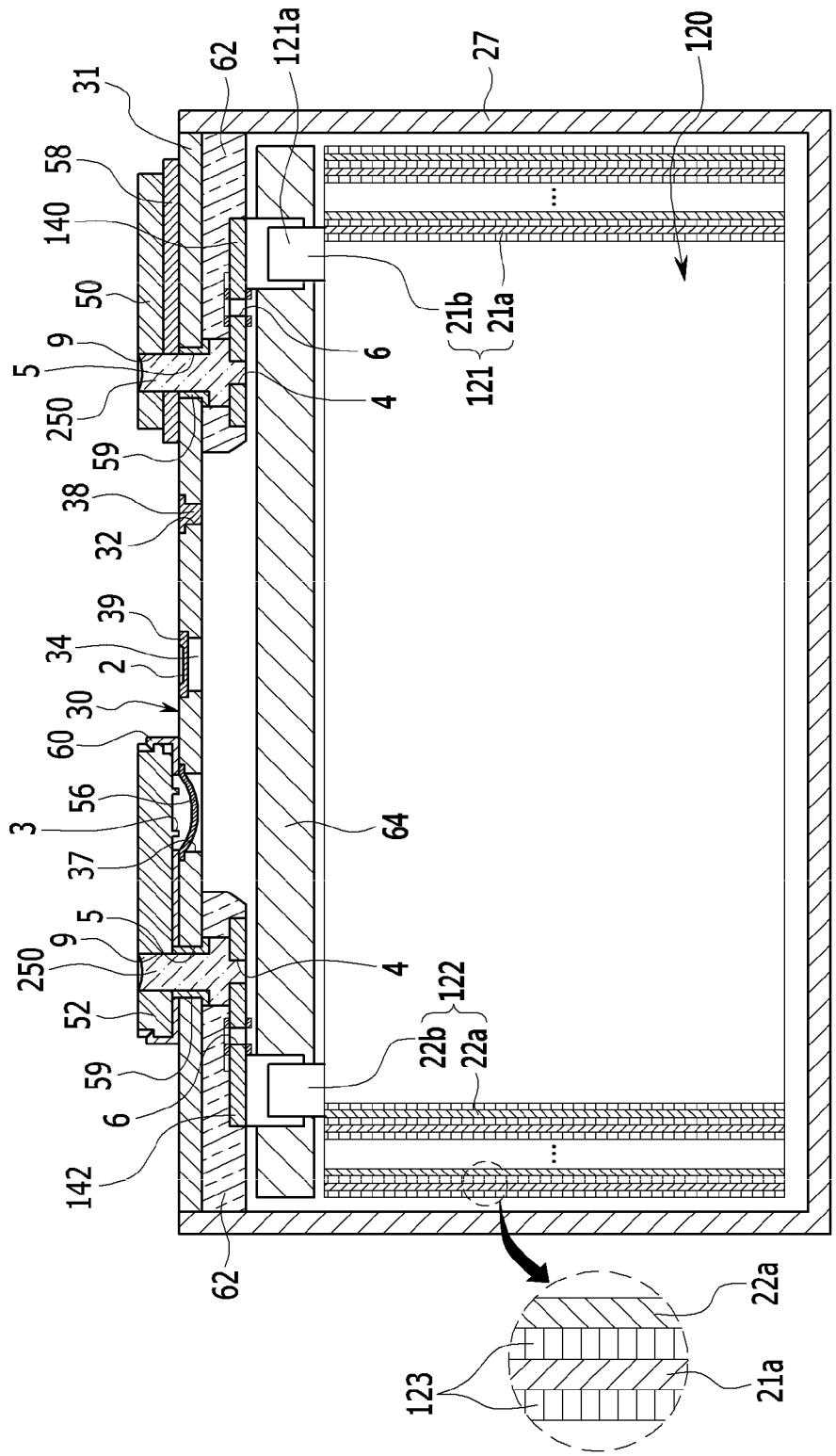
FIG. 5 is a cross-sectional view taken along the line V-V of FIG. 4.
Figure 6:
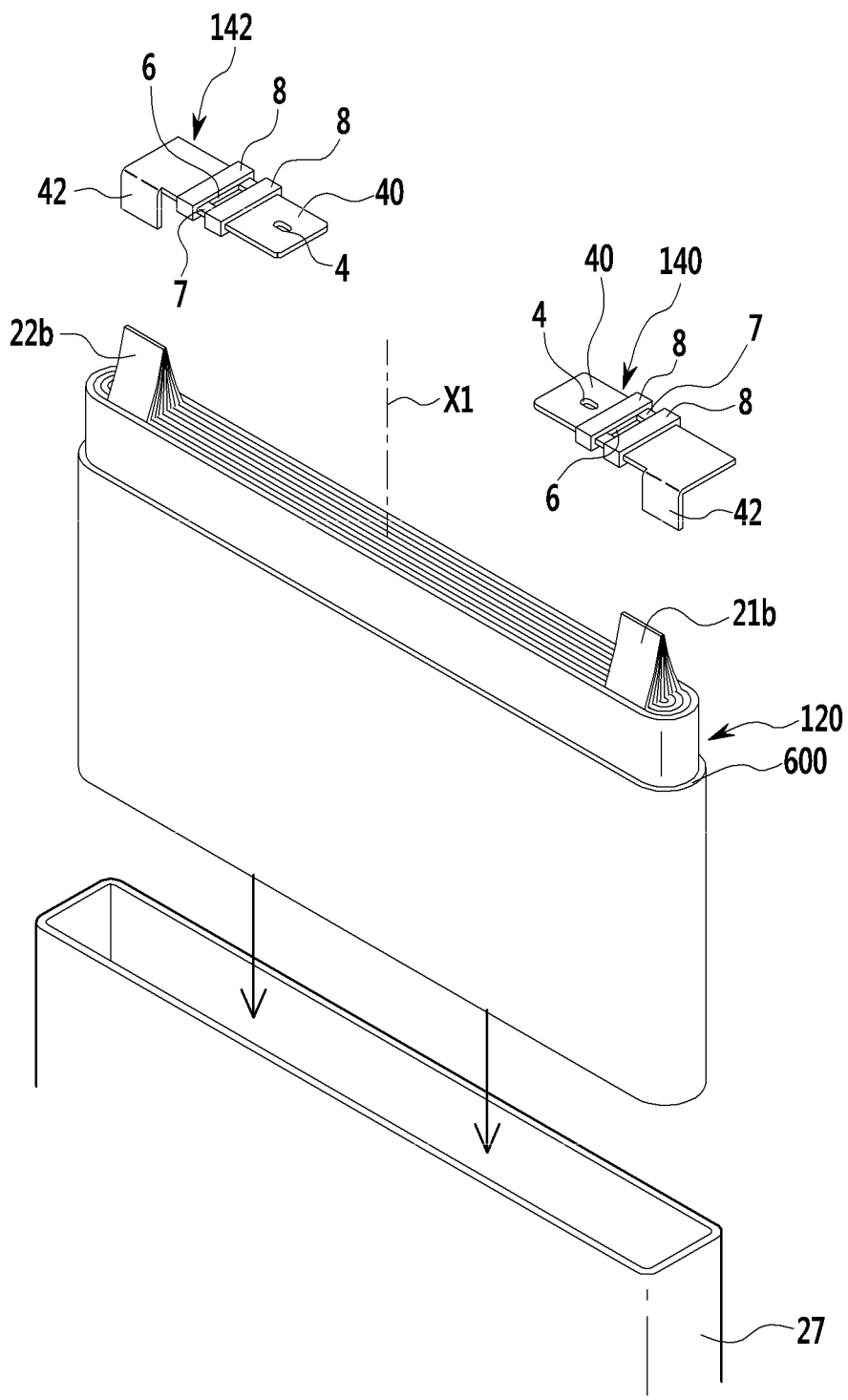
FIG. 6 is an exploded perspective view of the case, electrode assembly, and current collecting member of FIG. 4.

FIG. 4 is a cross-sectional view showing a rechargeable battery according to one or more embodiments of the present invention, FIG. 5 is a cross-sectional view taken along the line V-V of FIG. 4, and FIG. 6 is an exploded perspective view of the case, electrode assembly, and current collecting member of FIG. 4.

As shown in FIGS. 4 to 6, a rechargeable battery 101 according to one or more embodiments of the present invention includes an electrode assembly 120 formed by winding a first electrode 121, a second electrode 122, and a separator 123 interposed therebetween, current collecting members 140 and 142 electrically connected to the electrode assembly 120, a case 27 where the current collecting members 140 and 142 and the electrode assembly 120 are inserted, and a cap assembly 30 coupled to the opening of the case 27.

The rechargeable battery 101 may be an angular lithium-ion rechargeable.

However, the present invention is not limited thereto, and one or more embodiments of the present invention may be applied to various types of batteries, such as lithium-polymer batteries or cylindrical batteries, for example.

The electrode assembly 120 is wound around a winding axis X1, with the separator 123 interposed between the first electrode 121 and the second electrode 122, and then pressed flat. The first electrode 121 and the second electrode 122 include electrode plates 21a and 22a, respectively, which are regions coated with an active material, and electrode uncoated regions 21b and 22b, respectively, which are regions not coated with an active material. The first electrode 121 and the second electrode 122 each may include a thin plate made of a metal foil.

The first electrode plate 21a is formed by coating an active material such as a transition metal oxide on a metal foil, such as aluminum, and the second electrode plate 22a is formed by coating an active material such as graphite or carbon on a metal foil, such as copper or nickel.

The electrode assembly 120 is inserted into the case 27 in a direction parallel to the winding axis X1. Accordingly, the first electrode uncoated region 21b and the second electrode uncoated region 22b protrude from the top end of the electrode assembly 120. The first electrode uncoated region 21b and the second electrode uncoated region 22b are spaced apart from each other.

The first electrode uncoated region 21b and the second electrode uncoated region 22b are cut so as to protrude upward during the manufacture of the first electrode plate 21a and the second electrode plate 22a. Thus, the first electrode plate 21a and the second electrode plate 22a may be integrally formed with the first electrode plate 21a and the second electrode plate 22a, respectively.

The first electrode uncoated region 21b and the second electrode uncoated region 22b are each made up of overlapping thin films because they are formed by winding or overlapping the first electrode plate 21a and the second electrode plate 22a, respectively. The overlapping thin films of each electrode uncoated region 21b or 22b may be connected by ultrasonic welding to bring them into contact with each other and to allow current to easily flow (e.g., the thin films of the first electrode uncoated region 21b may be welded together and the thin films of the second electrode uncoated region 22b may be welded together).

The separator 123 is located between the first electrode plate 21a and the second electrode plate 22a. The separator 123 functions to prevent a short circuit and to allow (or facilitate) flow of lithium ions, and may be made of a composite film of polyethylene and polypropylene, for example.

The electrode assembly 120 is accommodated in the case 27, together with an electrolyte solution. The electrolyte solution may be made of a lithium salt such as $LiPF_6$ or $LiBF_4$ in an organic solvent such as EC, PC, DEC, EMC, or DMC. The electrolyte solution may be a liquid, solid, or gel.

The current collecting members include a first current collecting member 140 and a second current collecting member 142 that are connected to the first electrode uncoated region 21b and the second electrode uncoated region 22b, respectively. The first current collecting member 140 and the second current collecting member 142 have the same shape, so the following description of the first current collecting member 140 is generally applicable to the second current collecting member 142.

The first current collecting member 140 includes a current collecting bridge 42 that is bent from a plate-like current collector 40 and comes into contact with the electrode uncoated region 21b. The current collector 40 has a first terminal hole 4 and a fuse hole 6.

A connecting terminal 250 may be inserted through the first terminal hole 4 and connected to a first terminal 50 outside the cap assembly 30 to allow current to flow.

The first terminal hole 4 has the same shape as a horizontal cross-section of the connecting terminal 250, for example, a circular shape.

The fuse hole 6 may have an elongated shape that extends in a width direction of the first current collecting member 140. The portions of the first current collecting member 140 adjacent the fuse hole 6 in the width direction form a fuse 7. The fuse 7 has a relatively small width so the fuse 7 will break (or melt) if the temperature of the fuse 7 exceeds a predetermined temperature. Accordingly, when the rechargeable battery 101 generates heat following a malfunction or the like, the fuse 7 will break, preventing (or limiting) the rechargeable battery from further heating. This can prevent battery explosion caused by heating.

A pair of breaking members 8 are installed on respective sides of the fuse hole 6. The breaking members 8 cover the current collector 40 and may be fixed to the current collector 40. One breaking member 8 is located between the connecting terminal 250 and the fuse 7, and the other breaking member 8 is located between the fuse 7 and the current collecting bridge 42.

The breaking members 8 are made of a non-conductive material, and function to interrupt an arc. The breaking members 8 may be made of a polyimide, or a heat-resistant resin such as TEFLON®. The top ends of the breaking members 8 contact a second insulating member 62.

The cap assembly 30 includes a cap plate 31 covering the opening of the case 27, the first terminal 50 protruding above the cap plate 31 and electrically connected to the first electrode 121, and a second terminal 52 protruding above the cap plate 31 and electrically connected to the second electrode 122.

The cap plate 31 is in the shape of a long plate that extends in one direction, and is coupled to the opening of the case 27. The cap plate 31 may be made of the same material as the case 27, and may be coupled to the case 27 by laser welding. Accordingly, the cap plate 31 may have the same polarity as the case 27.

The cap plate 31 has an electrolyte solution injection opening 32 for injecting an electrolyte solution, and a second terminal hole 5 through which the connection terminal 250 is inserted. A vent plate 39 with a notch 2 is installed in a vent hole 34, and opens at a given pressure. A sealing plug 38 is installed in the electrolyte solution injection opening 32, and the connecting terminal 250 is inserted in the second terminal hole 5.

The first terminal 50 and the second terminal 52 are formed on top of the cap plate 31.

The first terminal 50 is electrically connected to the first electrode 121 via the first current collecting member 140, and the second terminal 52 is electrically connected to the second electrode 122 via the second current collecting member 142. However, the present invention is not limited thereto. For example, the first terminal 50 may be electrically connected to the second electrode 122 and the second terminal 52 may be electrically connected to the first electrode 121.

The first terminal 50 is generally shaped like a rectangular plate. The first terminal 50 is electrically connected to the first electrode 121 via the connecting terminal 250. The connecting terminal 250 is inserted in the first terminal hole 4, the second terminal hole 5, and a third terminal hole 9 of the first terminal 50, and is joined to the first current collecting member 140.

The connecting terminal 250 is generally cylindrical shaped, and its top end, i.e., the end fitted in the third terminal hole 9, is fixed to the first terminal 50 by welding.

The bottom end of the connecting terminal 250, i.e., the end fitted in the first terminal hole 4, is fixed to the first current collecting member 140 by welding. Accordingly, the first electrode 121 is electrically connected to the first terminal 50 through the first current collecting member 140 and the connecting terminal 250.

A sealing gasket 59 is installed in the second terminal hole 5 to seal any gaps between the connecting terminal 250 and the cap plate 31.

Like the first terminal 50, the second terminal 52 is electrically connected to the second electrode 122 through the connecting terminal 250 that is inserted into the first, second, and third terminal holes 4, 5, and 9 and is joined to the second current collecting member 142.

A connecting member 58 is formed between the first terminal 50 and the cap plate 31, and a first insulating member 60 is formed between the second terminal 52 and the cap plate 31.

Accordingly, the case 27 and the cap plate 31 are electrically charged with the same polarity as the first electrode 121 as they are electrically connected to the first electrode 50 through the connecting member 58. The second terminal 52 is insulated from the cap plate 31 by means of the first insulating member 60.

Short-circuit protrusions 3 protruding toward a short-circuit hole 37 formed in the cap plate 31 are formed at the bottom of the second terminal 52. The second terminal 52 longitudinally extends in one direction to cover the short-circuit hole 37. Accordingly, the first insulating member 60 may be longitudinally placed along the second terminal 52, and may be formed to cover the side of the second terminal 52. As shown in FIG. 3 and FIG. 4, the first terminal 50 and the second terminal 52 may have different lengths extending in a length direction perpendicular to the width direction. However, in one or more embodiments, the first terminal 50 and the second terminal 52 may be equal in length.

A short-circuit member 56 is installed in the short-circuit hole 37 of the cap plate 31 and is connected to sidewalls of the short-circuit hole 37. The short-circuit member 56 may short-circuit the first electrode 121 and the second electrode 122.

The short-circuit member 56 includes a curved portion that is bent in a convex arc toward the electrode assembly 120, and a flange portion that is formed on the outer side of the curved portion and fixed to the sidewalls of the short-circuit hole 37.

When a gas is produced inside of the rechargeable battery due to an abnormal reaction, the internal pressure of the rechargeable battery rises. If the internal pressure of the rechargeable battery exceeds a predefined pressure, the curved portion inverts and becomes convex toward the second terminal 52 and contacts the short-circuit protrusions 3 of the second terminal 52, causing a short-circuit. A short-circuit stops any battery reactions, which prevents an explosion or the like caused by a rise in internal pressure. Moreover, the fuse 7 will break or melt due to a high short-circuit current generated instantaneously by the short-circuit.

The second insulating member 62 is formed between the cap plate 31 and the first and second current collecting members 140 and 142, and a third insulating member 64 is formed between the first and second current collecting members 140 and 142 and the electrode assembly 120.

The second insulating member 62 and the third insulating member 64 can hold the first current collecting member 140 and the second current collecting member 142 in place, as well as insulate them.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS OF NON-LIMITING EMBODIMENTS

2: notch
3: short-circuit protrusion
4: first terminal hole
5: second terminal hole
6: fuse hole
7: fuse
8: breaking member
21a: first electrode plate
22a: second electrode plate
22b: first electrode uncoated region
22b: second electrode uncoated region
27: case
30: cap assembly
31: cap plate
32: electrolyte solution injection opening
34: vent hole
37: short-circuit hole
38: sealing plug
39: vent plate
46: connecting portion
50: first terminal
52: second terminal
56: short-circuit member
58: connecting member
59: sealing gasket
60: first insulating member
62: second insulating member
64: third insulating member
121: first electrode
122: second electrode
123: separator
140: first current collecting member
142: second current collecting member
250: connecting terminal
600: FINISHING TAPE

What is claimed is:

1. A rechargeable battery comprising:
an electrode assembly comprising first and second electrodes having different polarities, the electrode assembly being wound about a winding axis;
a finishing tape that covers a side and a lower end of the electrode assembly according to a virtual longitudinal center line perpendicular to a bottom face of the electrode assembly, the virtual longitudinal center line being in the same direction as the winding axis;
a case that accommodates the electrode assembly and has an opening, the electrode assembly being oriented in the case in a direction parallel to the winding axis;
a cap assembly coupled to the opening and sealing the case;
a first current collecting member and a second current collecting member located within the case and connected to the first electrode and the second electrode, respectively, the first current collecting member comprising:
a fuse hole; and
a pair of breaking members on respective sides of the fuse hole; and
a first terminal and a second terminal located on top of the cap assembly and connected to the first current collecting member and the second current collecting member, respectively.

2. The rechargeable battery of claim 1, wherein the finishing tape is bent toward the bottom face of the electrode assembly from the lower end of the electrode assembly and overlaps with a portion of the bottom face.

3. The rechargeable battery of claim 1, wherein a first region corresponding to a region wherein the finishing tape overlaps with a portion of the bottom face of the electrode assembly encloses a second region corresponding to a region of the bottom face that does not overlap with the finishing tape.

4. The rechargeable battery of claim 3, wherein a width of the first region is 1 mm or greater.

5. The rechargeable battery of claim 1, wherein the finishing tape is made of PET.

6. The rechargeable battery of claim 1, wherein the first electrode and the second electrode each comprise an electrode plate and an electrode uncoated region that protrudes from the electrode plate.

7. The rechargeable battery of claim 6, wherein the electrode uncoated region protrudes toward the cap assembly.

8. The rechargeable battery of claim 7, wherein the first current collecting member further comprises:
a plate-like current collector located between the cap assembly and the electrode assembly; and
a current collecting bridge that is bent from the current collector and comes into contact with the electrode uncoated region of the first electrode.

9. The rechargeable battery of claim 1, wherein the pair of breaking members each comprise a non-conductive material.

10. A rechargeable battery comprising:
an electrode assembly wound about a winding axis, and comprising first and second electrodes having different polarities, the first electrode and the second electrode each comprising:
an electrode plate; and
an electrode uncoated region that protrudes from the electrode plate;
a finishing tape that covers a side and a lower end of the electrode assembly according to a virtual longitudinal center line perpendicular to a bottom face of the electrode assembly;
a case that accommodates the electrode assembly and has an opening, the electrode assembly being oriented in the case in a direction parallel to the winding axis;
a cap assembly coupled to the opening and sealing the case;
a first current collecting member and a second current collecting member located within the case and connected to the first electrode and the second electrode, respectively, the first current collecting member comprising:
a fuse hole; and
a pair of breaking members on respective sides of the fuse hole; and
a first terminal and a second terminal located on top of the cap assembly and connected to the first current collecting member and the second current collecting member, respectively,
wherein the electrode uncoated region protrudes toward the cap assembly,
wherein the first current collecting member further comprises:
a plate-like current collector located between the cap assembly and the electrode assembly; and
a current collecting bridge that is bent from the current collector and comes into contact with the electrode uncoated region of the first electrode, and,
wherein one of the breaking members from among the pair of breaking members is located between the first terminal and the fuse hole.

11. The rechargeable battery of claim 10, wherein another one of the breaking members from among the pair of breaking members is located between the fuse hole and the current collecting bridge.

* * * * *